United States Patent
Mundra et al.

(10) Patent No.: US 11,972,030 B2
(45) Date of Patent: *Apr. 30, 2024

(54) SECURE MESSAGE ROUTING

(71) Applicant: Texas Instruments Incorporated, Dallas, TX (US)

(72) Inventors: Amritpal Singh Mundra, Allen, TX (US); Eric Lasmana, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 188 days.

This patent is subject to a terminal disclaimer.

(21) Appl. No.: 17/402,693

(22) Filed: Aug. 16, 2021

(65) Prior Publication Data

US 2021/0374286 A1 Dec. 2, 2021

Related U.S. Application Data

(63) Continuation of application No. 16/221,344, filed on Dec. 14, 2018, now Pat. No. 11,093,653.

(Continued)

(51) Int. Cl.
*G06F 21/72* (2013.01)
*G06F 9/54* (2006.01)
(Continued)

(52) U.S. Cl.
CPC .............. *G06F 21/72* (2013.01); *G06F 9/546* (2013.01); *G06F 15/7807* (2013.01); *G06F 21/74* (2013.01)

(58) Field of Classification Search
CPC .......... G06F 21/72; G06F 21/74; G06F 9/546; G06F 15/7807

See application file for complete search history.

(56) References Cited

U.S. PATENT DOCUMENTS 10,340,916 B1 7/2019 Gibney et al.
2015/0188949 A1* 7/2015 Mahaffey ............ H04L 41/0894
726/1

(Continued)

FOREIGN PATENT DOCUMENTS

CN 101366291 A 2/2009
CN 103701611 A 4/2014
(Continued)

OTHER PUBLICATIONS

PCT Search Report for PCT/US2019/033757 dated Oct. 10, 2019.

*Primary Examiner* — Hee K Song
(74) *Attorney, Agent, or Firm* — Michael T. Gabrik; Frank D. Cimino

(57) ABSTRACT

In described examples, a method of routing messages in a system on a chip (SoC) includes a secure message router receiving a message including a content, an identifier of the message's sending (origin) functional block and/or of a receiving (destination) functional block, a message secure value, a promote value, and a demote value. A context corresponding to the identifier is retrieved from a memory. The context includes an allow promote value and an allow demote value. The message secure value is increased if the promote value requests the increase and matches the allow promote value. The message secure value is decreased if the demote value requests the decrease and matches the allow demote value. Cleartext corresponding to the content is made accessible by the destination if the context secure value matches the message secure value. The message is then outputted from the secure message router to the destination.

20 Claims, 3 Drawing Sheets

Related U.S. Application Data

(60) Provisional application No. 62/676,040, filed on May 24, 2018.

(51) Int. Cl.
    *G06F 15/78*     (2006.01)
    *G06F 21/74*     (2013.01)

(56) References Cited

U.S. PATENT DOCUMENTS

| | | |
|---|---|---|
| 2016/0127367 A1 | 5/2016 | Jevans |
| 2016/0301671 A1* | 10/2016 | Dahlstrom ............ G06F 9/4401 |
| 2016/0309331 A1 | 10/2016 | Moon |
| 2017/0054596 A1 | 2/2017 | Murray et al. |
| 2019/0094939 A1 | 3/2019 | Yeager et al. |

FOREIGN PATENT DOCUMENTS

| | | |
|---|---|---|
| CN | 104662864 A | 5/2015 |
| CN | 107004097 A | 8/2017 |
| EP | 2466828 A1 | 6/2012 |
| WO | 2014022778 A1 | 2/2014 |

* cited by examiner

SECURE MESSAGE ROUTING

This application is a continuation of U.S. patent application Ser. No. 16/221,344, filed Dec. 14, 2018, which claims priority to U.S. Provisional Pat. App. No. 62/676,040, filed on May 24, 2018, each of which is incorporated herein by reference.

BACKGROUND

This application relates generally to hardware-based security in integrated circuit (IC) devices, and more particularly to security level permissions control in hardware-based security.

A system on a chip (SoC) comprises multiple functional blocks, with different functional blocks—and, typically, different sub-blocks within functional blocks—having different functions. For example, functional blocks or sub-blocks (for convenience, collectively referred to as "functional blocks" herein) on an SoC can include one or more microcontrollers, microprocessors, or digital signal processor (DSP) cores; memory blocks, such as read-only memory (ROM) or random-access memory (RAM); clock signal generators; input/output (I/O) interfaces; analog interfaces; voltage regulators and power management circuits; and intellectual property (IP) cores. Hardware-based security, i.e., controlling message flow among functional blocks at a hardware level, can be used to harden an SoC against attackers attempting to gain unauthorized access to (for example) message contents, memory contents, device functions, and device I/O and corresponding communication permissions.

In some implementations, a central processing unit (a CPU, such as an advanced RISC (reduced instruction set computer) machine (ARM), or a digital signal processor (DSP)) controls transfer of data between secure and non-secure portions of an IC (secure or non-secure "worlds"). This control can include controlling saving and restoring of context corresponding to respective secure and non-secure worlds, and flushing of secure or non-secure information before switching to a non-secure or secure world (respectively). When messages are moving back and forth between secure and non-secure worlds at a high frequency (typical in some applications, such as playback of video controlled by digital rights management (DRM) technology), the CPU can be forced to expend significant resources (such as device area and transmission bandwidth) to maintain effective control over message transport between secure and non-secure worlds.

SUMMARY

In described examples, a method of routing messages in a system on a chip (SoC) includes a secure message router receiving a message including a content, an identifier of the message's sending (origin) functional block and/or of a receiving (destination) functional block, a message secure value, a promote value, and a demote value. A context corresponding to the identifier is retrieved from a memory. The context includes an allow promote value and an allow demote value. The message secure value is increased if the promote value requests the increase and matches the allow promote value. The message secure value is decreased if the demote value requests the decrease and matches the allow demote value. Cleartext corresponding to the content is made accessible by the destination if the context secure value matches the message secure value. The message is then outputted from the secure message router to the destination.

DETAILED DESCRIPTION

As used herein, a "security level" refers to a message's access to device functionality. For example, a higher security level would have access to a particular corresponding set of device functionality that is associated with a relatively higher security, such as certain types of memory and execution access in one or more particular functional blocks. A lower security level would have access to a different corresponding set of device functionality. Higher security level generally corresponds to more secure device regions, and lower security level generally corresponds to less secure device regions.

Figure 1:
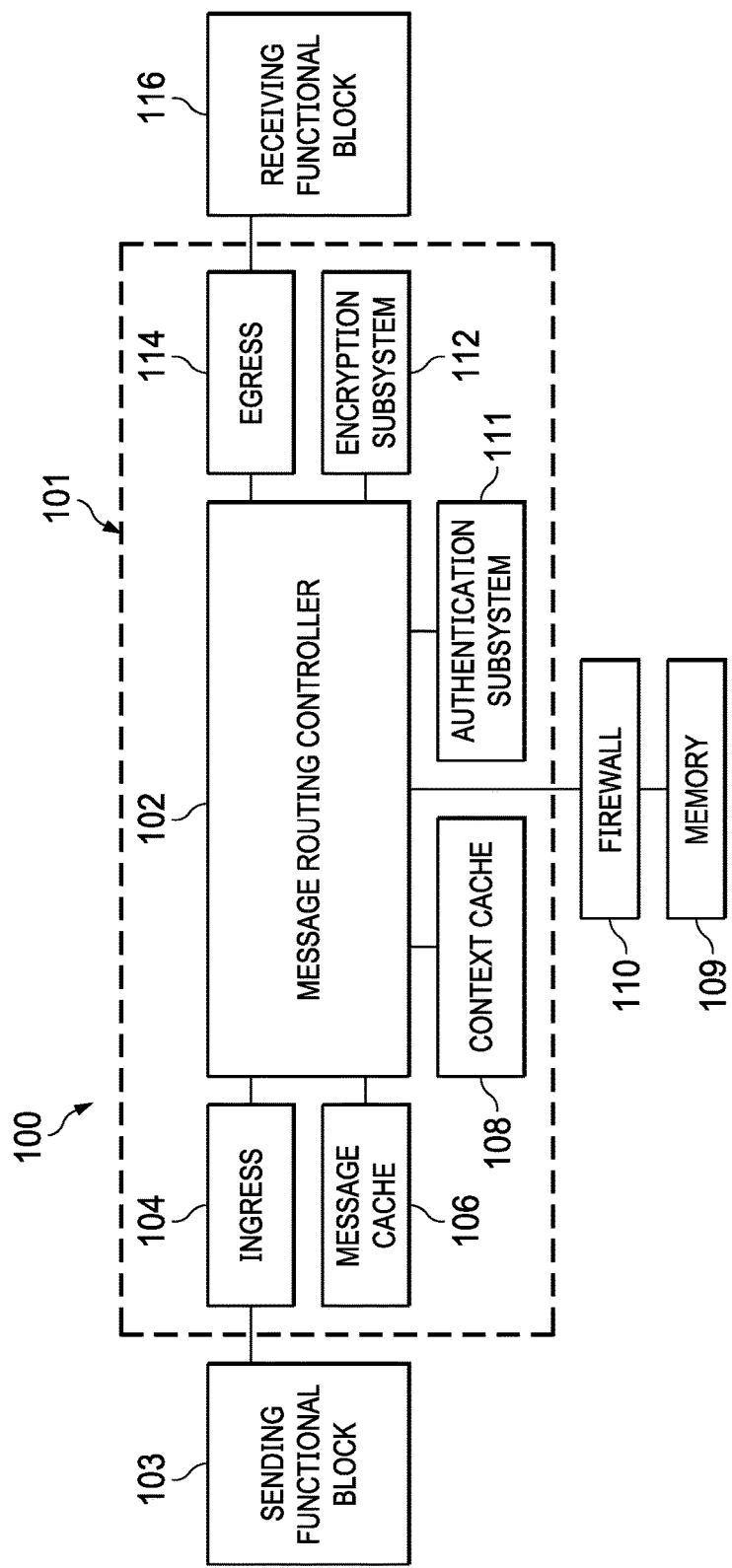
FIG. 1 shows an example of a functional block layout of a secure message router in an SoC.

FIG. 1 shows an example of a functional block layout 100 of a secure message router 101 in an SoC. The router 101 can be used to control whether a message 202 (packet, see FIG. 2) is permitted to access secure resources, using content of the message 202 and a stored context 406 corresponding to, for example, the origin (sending functional block 103) and/or destination (receiving functional block 116) of the message 202. This includes configurations in which the sending functional block 103 is not configured to be secure, and the receiving functional block 116 is configured to be secure. Whether a functional block is configured to be secure can depend on, for example, whether the functional block includes firewall sub-blocks which only allow messages with appropriate permissions to enter and/or exit the functional block.

As shown in FIG. 1, the router 101 includes a message routing controller 102, which is connected to an ingress 104, a message cache 106, a context cache 108, a firewall 110, an authentication subsystem 111, an encryption subsystem 112, and an egress 114. The message routing controller 102 is connected to a firewall 110. The firewall 110 may be outside the router 101, located near a memory 109 (e.g., a secure permanent memory) to which the firewall 110 is connected. The memory 109 may contain multiple contexts 406 which can be retrieved depending on an identifier of a message 202 and an identifier of a context 406, as further described below. The sending functional block 103 and the receiving functional block 116 are external to the router 101.

A sending functional block 103 is connected to send a message 202 to the ingress 104. The egress 114 is connected to a receiving functional block 116 specified by the message 202. A secure routing process is described below with respect to FIGS. 1, 2 and 3, and an example is provided with respect to FIG. 4.

The ingress 104 receives a message 202 from a sending (origin) functional block 103 outside the router 101, and delivers the message 202 to the message routing controller 102. A message 202 includes, for example, encrypted data and/or instructions (or other encrypted content), a pointer to a corresponding decryption key, identifier information unique to the IC (the chip which includes the router 101), and other security-related information, as further described with respect to FIG. 2. (An IC-unique identifier can, for example, be derived from a physically unclonable function (PUF).) The message routing controller 102 causes the message 202 to be stored in the message cache 106, and fetches a context 406 corresponding to the message 202 (for example, corresponding to the origin and/or destination of the message) from the memory 109. The context 406 also includes an IC-unique identifier. The firewall 110 checks the message's IC-unique identifier against the context's 406 IC-unique identifier. If the IC-unique identifiers match, then the context 406 is stored in the context cache 108. (If the identifiers do not match, an exception is generated, and the message 202 is passed to the egress 114 for forwarding to a receiving functional block 116 without being decrypted, preventing cleartext content corresponding to the encrypted content of the message 202 from being accessed by the receiving functional block 116.) (Cleartext is readable, unencrypted data.) A context 406 also includes, for example, security information indicating source(s) and type(s) of messages 202 which are allowed to access the receiving functional block 116, as well as encryption and decryption keys, an initialization vector (IV, used by encryption), and partial data (part of a message packet which requires additional packet content before an encryption algorithm can be applied).

Figure 2:
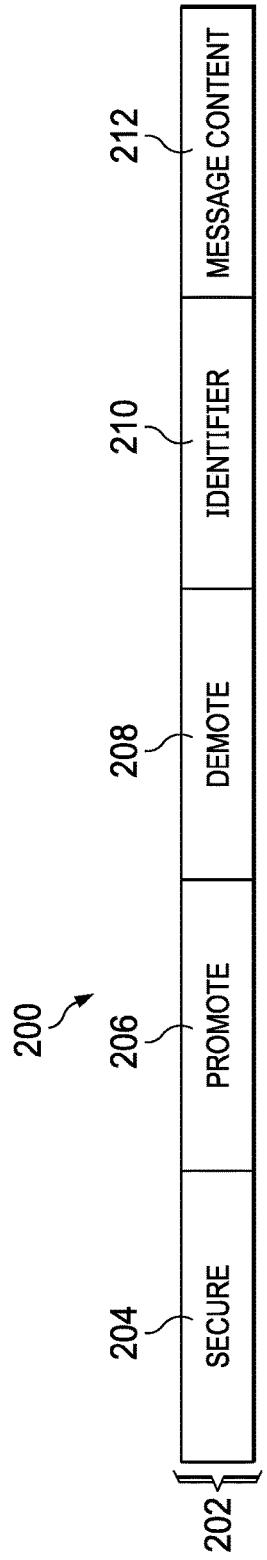
FIG. 2 shows an example of a message structure for intra-SoC communications.
Figure 3:
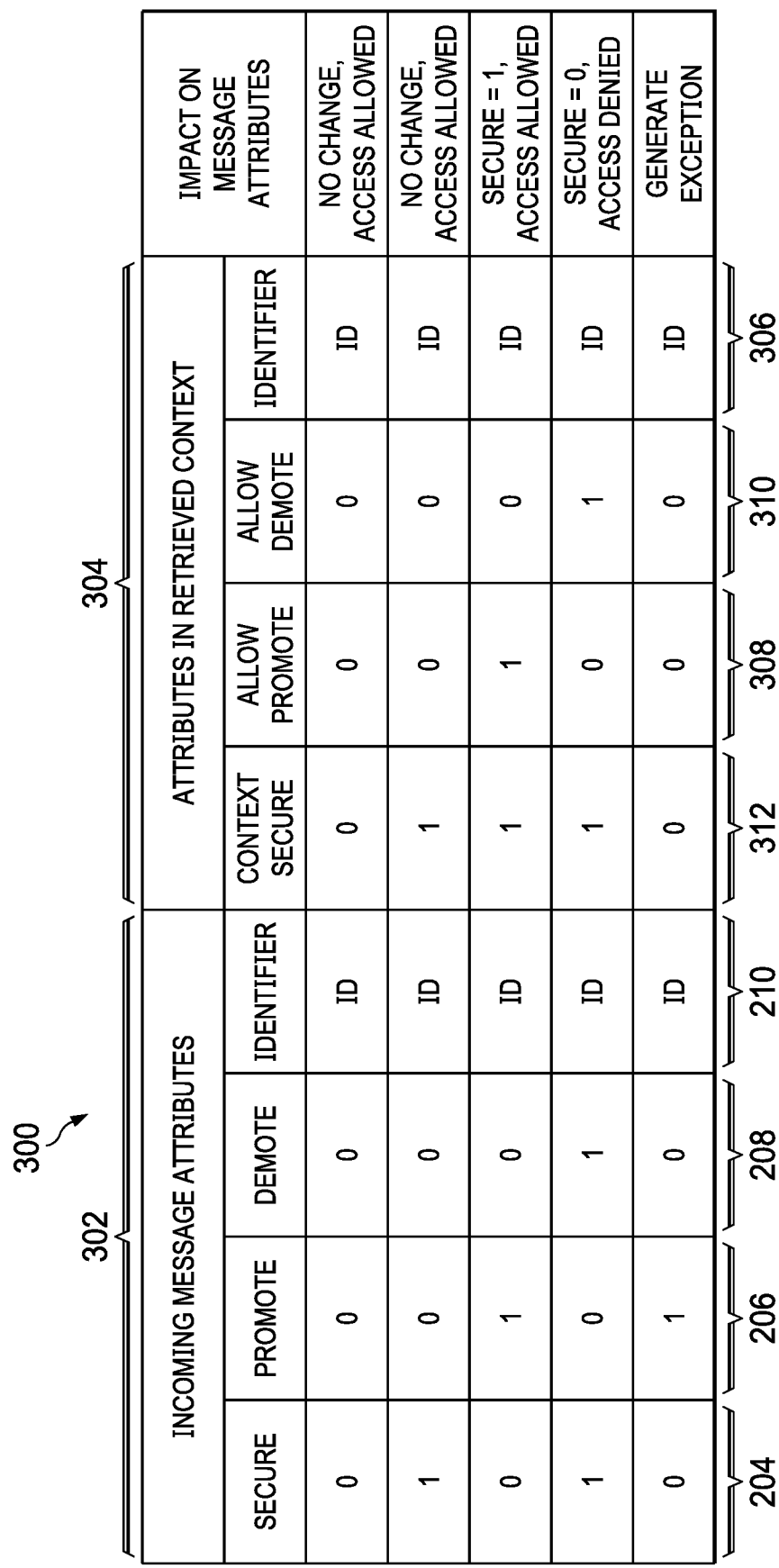
FIG. 3 shows an example table showing behaviors of a secure message router of FIG. 1 in response to messages with various values for certain message content fields shown in FIG. 2, and various values for context contents.

If the IC-unique identifier check is passed, then the message routing controller 102 uses the context 406, and the content of the message 202, to determine whether to promote or demote the security level of the message 202, as further described with respect to FIG. 3. The security level of the message is indicated by a secure value 204 of the message 202, as further described with respect to FIG. 2. The message routing controller 102 then compares the context 406 against security information in the message 202, such as the security level of the message 202, a source (sending functional block 103) of the message 202, and a type of the message 202. If this comparison confirms that the message 202 is allowed to be accessed by the receiving functional block 116 specified by the message 202, then the source of the message 202 is authenticated using the authentication subsystem 111 and the context 406. (Access by a receiving functional block 116 refers to permission to decrypt the encrypted content within the message 202, and to forward the decrypted content to the receiving functional block 116.) The comparison includes determining whether the security level of the message 202 corresponds to a security level of the receiving functional block 116 and/or the message's 202 type, as further described below with respect to FIGS. 2 and 3.

The authentication subsystem 111 can use, for example, SHA1 (Secure Hash Algorithm 1), SHA2 (Secure Hash Algorithm 2), or MD5 (MD5 Message-Digest Algorithm) supporting keyed (HMAC, or keyed-hash message authentication code) or non-keyed hash calculation. If the message 202 passes authentication, then the message 202 is decrypted using the encryption subsystem 112 and the context 406. The encryption subsystem can use, for example, an AES (Advanced Encryption Standard) core, a 3DES (Triple Data Encryption Algorithm, or Triple Data Encryption Standard) core, and a Galois multiplier core, operated with an MCE (Mode Control Engine). The MCE can implement various encryption modes, such as ECB (Electronic Codebook), CBC (Cipher Block Chaining), CTR (Counter mode), OFB (Output Feedback), or GCM (Galois/Counter mode).

In the illustrated example, messages 202 are passed to the egress 114 for delivery to the receiving functional block 116 (destination) specified by the message 202 regardless of whether: the IC-unique identifiers of the message 202 and the context 406 match; the security level of the message 202 matches the security level of the receiving functional block 116; the message 202 passes authentication by the authentication subsystem 111; and the content of the message 202 is decrypted by the encryption subsystem 112. Accordingly, messages 202 which fail a context 406 comparison or the authentication check are not decrypted, but are still passed to the egress 114 for delivery. Undecrypted messages 202 will not be able to be accessed (except as encrypted data—effectively, gibberish) by the receiving functional block 116. Also, on failure of context 406 comparison or of authentication check, a corresponding security exception is generated.

In the illustrated example, the sending functional block 103 is configured not to have access to memory in which a message 202 delivered to the egress 114 (a message 202 output from the message routing controller 102) is stored. Accordingly, the sending functional block 103 does not have access to internal memories of the router 101. In some embodiments, the sending functional block 103 may have access to an external memory of the router 101 (such as the memory 109) if the sending functional block 103 can pass checks at a corresponding firewall (such as the firewall 110).

FIG. 2 shows an example of a message structure 200 for intra-SoC communications. As shown in FIG. 2, a message 202 includes a secure value 204, a promote value 206, a demote value 208, an identifier 210, and other message content 212. The secure value 204, promote value 206, and demote value 208 each includes one or more bits. The secure value 204 indicates which functional blocks are allowed to access the message 202—that is, only functional blocks with a security level corresponding to the secure value 204 are allowed to access the message 202. The promote value 206 indicates whether the message 202 requests that its secure value 204 be increased. For example, a promote value 206 of one (1) can indicate that the message 202 requests that its secure value 204 be increased, while a promote value 206 of zero (0) indicates that the message 202 does not request that its secure value 204 be increased. The demote value 208 indicates whether the message 202 requests that its secure value 204 be decreased. For example, a demote value 208 of one (1) can indicate that the message 202 requests that its secure value 204 be decreased, while a demote value of zero (0) indicates that the message 202 does not request that its secure value 204 be decreased.

FIG. 3 shows an example table 300 showing behaviors of the secure message router 101 of FIG. 1 in response to messages 202 with various values for certain message content fields shown in FIG. 2, and various values for context 406 contents. FIG. 3 shows contents 302 of a message 202, and contents 304 of a context 406. The context 406 is retrieved based on a comparison between the identifier 210 of the message 202 and an identifier 306 of the context 406.

If a promote value 206 is zero (0), and a demote value 208 is zero (0), then the secure value 204 will not change. If a secure value 204 is zero (0), a promote value 206 is one (1), and an allow promote value 308 is one (1), then the secure value 204 will be increased to one (1). (In this example embodiment, if the promote value 206 is one, then the demote value 208 is required to be zero; and if the demote value 208 is one, then the promote value 206 is required to be zero.) If a secure value 204 is one (1), a demote value 208 is one (1), and an allow demote value 310 is one (1), then the secure value 204 will be decreased to zero (0). If the promote value 206 is one (1), the allow promote value 308 is zero (0), the secure value 204 is zero (0), and the context secure value 312 is zero (0), then an exception is generated (security properties of the message 202 do not match security properties of the context 406), and the message 202 is passed unmodified (undecrypted) to the egress 114 for output to the destination functional block 116.

If a secure value 204 is zero (0), and a context secure value 312 of the context 406 is also zero (0) (indicating a match between the security level of the message's 202 destination functional block, and the secure value 204 of the message 202), then the destination functional block 116 will be allowed to access cleartext content corresponding to the encrypted content of the message 202 (the message 202 will be passed to the egress 114 for output to the destination functional block 116 in cleartext form (see FIG. 4), if the message 202 passes authentication and after the message 202 is decrypted). If a secure value 204 is one (1), and a context secure value 312 is zero (0) (or if a secure value 204 is zero (0), and a context secure value 312 is one (1)) then the destination functional block will not be allowed to access the message 202. If a secure value 204 is one (1), and a context secure value 312 is one (1), then the destination functional block 116 will be allowed to access the message 202.

Figure 4:
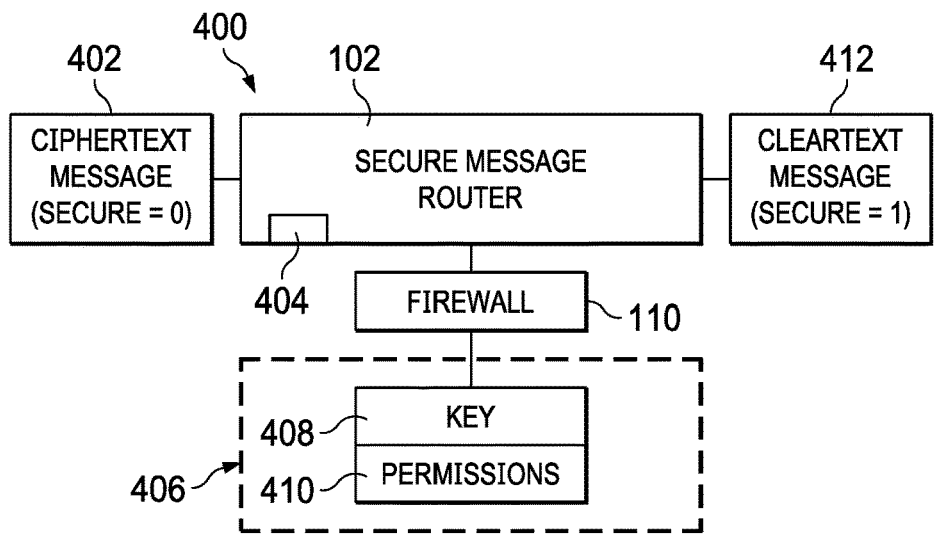
FIG. 4 shows an example execution of a process for secure message routing.

FIG. 4 shows an example execution 400 of a process for secure message routing. As shown in FIG. 4, the secure message router 101 receives a ciphertext message 402 (a message 202 with encrypted content) with a secure value 204 of zero. The ciphertext message 402 is stored in local memory 404 (message cache 106) of the secure message router 101. The secure message router 101 then fetches a context 406 from a secure memory. The context 406 includes a cryptographic key 408 for decrypting the ciphertext message 402, and permissions 410 specifying which message sources and types are allowed to be decrypted (corresponding to a receiving functional block 116 being given access to decrypted—cleartext—content of the ciphertext message 402). If a firewall 110 confirms that an IC-unique identifier of the message 402 matches an IC-unique identifier of the context 406, the context 406 is stored in local memory 404 (cache memory 108) of the secure message router 101. In this example, the ciphertext message 402 requests security level promotion and the permissions 410 in the context 406 allow security level promotion, and the ciphertext message 402 passes authentication. Therefore, the ciphertext message 402 is decrypted, and a corresponding cleartext message 412 (containing a decrypted version of the ciphertext message's 402 encrypted content) with a secure value 204 of one is outputted by the secure message router 101.

To summarize: the message 202 will be passed to the receiving functional block 116 regardless of whether the message 202 passes identification, security level, and authentication checks. However, the information payload of the message 202 is initially encrypted, and that information payload is not decrypted unless the message 202 passes the identifier and authentication processes, which are mediated by the context 406.

Figure 5:
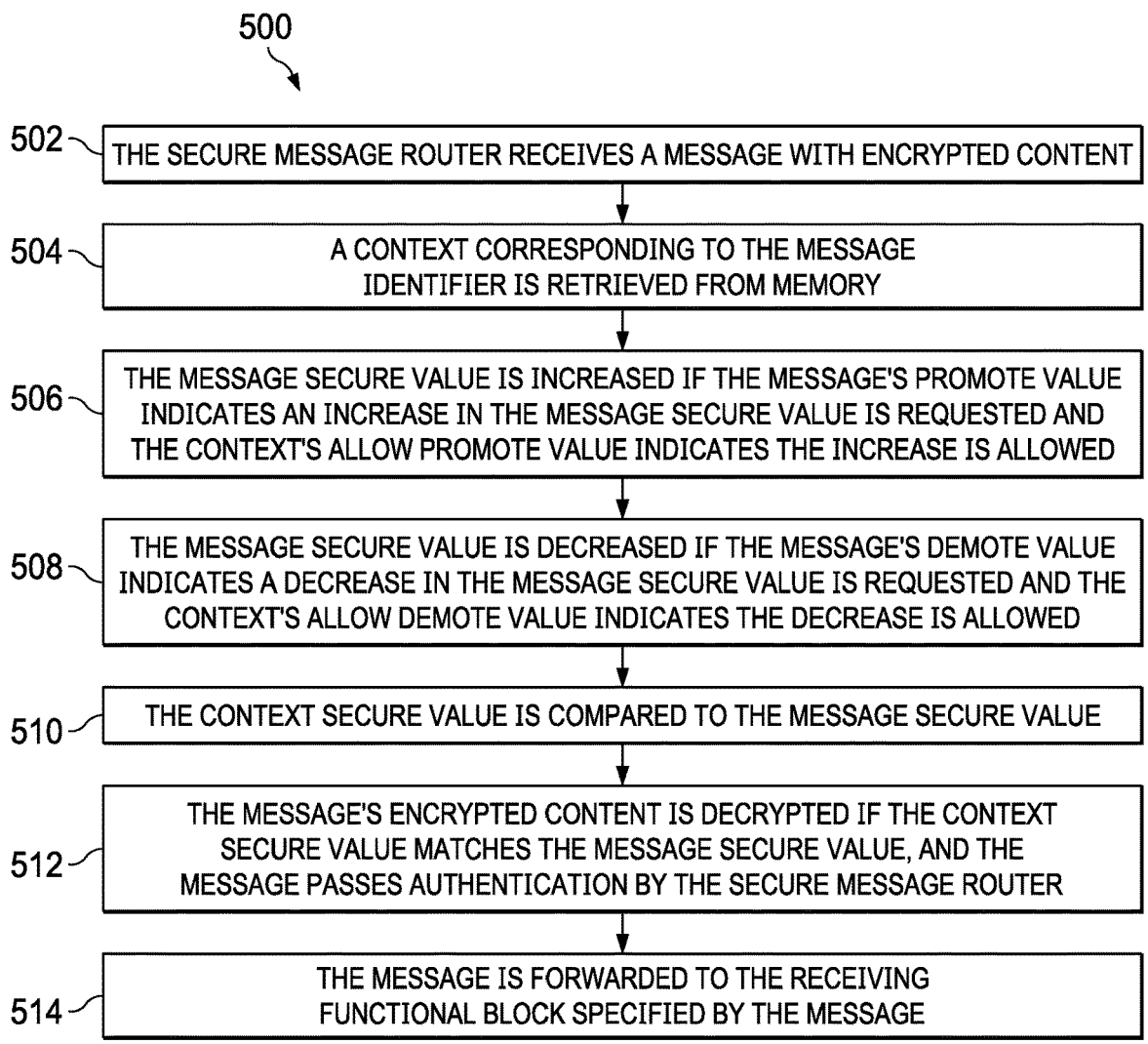
FIG. 5 shows an example process for secure message routing.

FIG. 5 shows an example process 500 for secure message routing. In step 502, a secure message router receives a message with encrypted content. In step 504, the secure message router causes a context 406 corresponding to an identifier of the message to be retrieved from a memory. In step 506, the message secure value is increased if the message's promote value indicates an increase in the message secure value is requested and the context's 406 allow promote value indicates the increase is allowed. In step 508, the message secure value is decreased if the message's demote value indicates a decrease in the message secure value is requested and the context's 406 allow demote value indicates the decrease is allowed. (While steps 506 and 508 are shown with step 508 following step 506 in FIG. 5, and are described in this sequence herein, they are not necessarily performed in this sequence.) In step 510, the context secure value is compared to the message secure value. In step 512, the message's encrypted content is decrypted if the context secure value matches the message secure value, and the message passes authentication by the secure message router. In step 514, the message is forwarded to the receiving functional block specified by the message, regardless of whether the secure message router decrypted the message's encrypted content.

Using secure message routers to control message routing based on security-related permissions can result in a significant performance boost, such as significant improvements in latency times. Use of dedicated secure message routers can also enable a shifting of message routing load away from limited CPU resources.

Modifications are possible in the described embodiments, and other embodiments are possible, within the scope of the claims.

In some embodiments, messages are authenticated and decrypted regardless of message contents, and the comparison of message contents against the context determines whether the message is passed to the egress for delivery to and execution (or other functional operation, such as storage or transmission) by the device resources specified by the message.

In some embodiments, messages are not passed to a receiving functional block if they do not pass identifier check(s) and/or authentication and/or other security checks.

In some embodiments, more than two security levels (e.g., zero and one) are used. In some embodiments using more than two security levels, a message structure includes a secure value including multiple bits. In some embodiments using more than two security levels, a message structure includes a promote value including multiple bits. In some embodiments using more than two security levels, a message structure includes a demote value including multiple bits.

In some embodiments, a message is decrypted if the message has the same security level as the receiving functional block. In some embodiments, a message is decrypted if the message has the same or higher security level as (or than) the receiving functional block. In some embodiments, messages from a lowest security level are not encrypted.

In some embodiments, a secure message router also includes a TRNG (true random number generator) module and a PKA (public key accelerator) module. TRNG and PKA modules can be used to assist key generation and computation.

In some embodiments, authentication is not performed.

In some embodiments, different IC-unique identifiers correspond to different sending functional blocks and/or different receiving functional blocks.

Memory and memory elements described in the examples herein may be non-transitory memory types.

In some embodiments, the context can include a flag which allows a particular message, origin or type of message, message coinciding with an alarm or other exceptional device state, or other class of messages, to be decrypted (or otherwise enabled to be accessed by the receiving functional block) regardless of some or all other permission conditions (such as identifier, security level, and authentication information).

In some embodiments, decrypting an encrypted content of the message (or otherwise enabling access by the destination functional block to a cleartext content corresponding to an information payload of the message) is responsive to at least the context secure value and the message secure value. In some embodiments, direct comparison between the context secure value and the message secure value is not performed.

While the specific embodiments described above have been shown by way of example, it will be appreciated that many modifications and other embodiments will come to the mind of one skilled in the art having the benefit of the teachings presented in the foregoing description and the associated drawings. Accordingly, it is understood that various modifications and embodiments are intended to be included within the scope of the appended claims.

What is claimed is:

1. A circuit device comprising:
a router that includes:
an ingress port configured to couple to a sending block to receive a message;
an egress port configured to couple to a receiving block to provide the message;
and
a controller coupled between the ingress port and the egress port; and
a firewall coupled to the router, wherein:
the message specifies an identifier, a security level, and a field that indicates whether to change the security level; and
the controller is configured to:
provide the identifier to the firewall;
receive, from the firewall, a context associated with the identifier; and
when the field indicates to change the security level, determine whether to change the security level of the message based on the context.

2. The circuit device of claim 1, wherein:
the message includes encrypted data; and
the controller is configured to determine whether to decrypt the encrypted data to provide decrypted data to the receiving block based on the security level of the message, the field of the message, and the context.

3. The circuit device of claim 2, wherein the controller is configured to:
when the controller determines not to decrypt the encrypted data, provide the message including the encrypted data to the receiving block; and
when the controller determines to decrypt the encrypted data, provide the message including the decrypted data to the receiving block.

4. The circuit device of claim 1 further comprising a system-on-a-chip that includes, the sending block, the receiving block, the router, and the firewall.

5. The circuit device of claim 1, wherein the identifier identifies at least one of: the sending block or the receiving block.

6. The circuit device of claim 1, wherein the field includes a first portion that indicates whether to promote the security level of the message and a second portion that indicates whether to demote the security level of the message.

7. The circuit device of claim 1, wherein the context includes a first portion that indicates whether promotion of the security level of the message is permitted and a second portion that indicates demotion of the security level of the message is permitted.

8. The circuit device of claim 1, wherein the controller is configured to provide an exception based on the field indicating to change the security level and the context specifying that the change of the security level is not permitted.

9. The circuit device of claim 1, wherein the router further includes an authentication system coupled to the controller that is configured to authenticate a source of the message.

10. A system-on-a-chip device comprising:
a first functional block configured to provide a message that specifies a security level, a field that indicates whether to change the security level, and an identifier;
a second functional block;
a router coupled between the first functional block and the second functional block, wherein:
the router includes a controller coupled between the first functional block and the second functional block; and
the controller is configured to:
retrieve a context based on the identifier of the message;
determine whether to change the security level based on the field and the context; and
provide the message to the second functional block.

11. The system-on-a-chip device of claim 10, wherein:
the message includes encrypted data; and
the controller is configured to determine whether to decrypt the encrypted data to provide decrypted data to the second functional block based on the security level of the message, the field of the message, and the context.

12. The system-on-a-chip device of claim 11, wherein the controller is configured to:
when the controller determines not to decrypt the encrypted data, provide the encrypted data to the second functional block; and
when the controller determines to decrypt the encrypted data, provide the decrypted data to the second functional block.

13. The system-on-a-chip device of claim 10, wherein the identifier identifies at least one of: the first functional block or the second functional block.

14. The system-on-a-chip device of claim 10, wherein the field includes a first portion that indicates whether to promote the security level of the message and a second portion that indicates whether to demote the security level of the message.

15. The system-on-a-chip device of claim 10, wherein the context includes a first portion that indicates whether promotion of the security level of the message is permitted and a second portion that indicates demotion of the security level of the message is permitted.

16. The system-on-a-chip device of claim 10, wherein the controller is configured to provide an exception based on the field indicating to change the security level and the context specifying that the change of the security level is not permitted.

17. The system-on-a-chip device of claim 10, wherein the router further includes an authentication system coupled to the controller that is configured to authenticate a source of the message.

18. A method comprising:
  receiving a message that specifies an identifier, a security level, and a field that indicates whether to change the security level;
  receiving a context associated with the identifier;
  comparing the security level and the field that indicates whether to change to security level to the context associated with identifier; and
  determining whether to change the security level of the message based on the comparing.

19. The method of claim 18, wherein:
  the message further includes an encrypted payload; and
  the method further comprises determine whether to decrypt the encrypted payload to provide a decrypted payload based on the security level of the message, the field of the message, and the context.

20. The method of claim 19 further comprising, based on a determination not to decrypt the encrypted payload, providing the encrypted payload.

\* \* \* \* \*